UNITED STATES PATENT OFFICE.

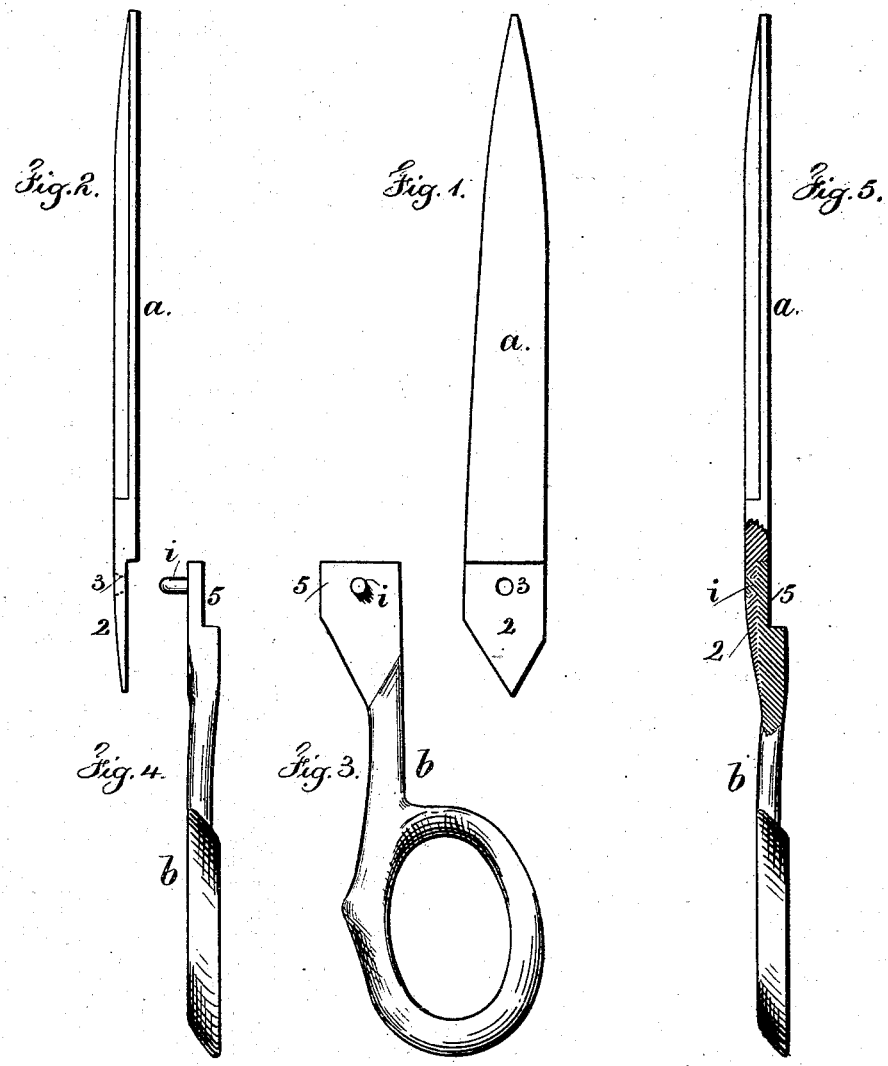

ROBERT A. GOODCHILD, OF NEW YORK, N. Y.

MANUFACTURE OF SHEARS AND SCISSORS.

SPECIFICATION forming part of Letters Patent No. 252,096, dated January 10, 1882.

Application filed September 29, 1881. (No model.)

*To all whom it may concern:*

Be it known that I, ROBERT A. GOODCHILD, of the city and State of New York, have invented an Improvement in the Manufacture of Shears and Scissors, of which the following is a specification.

In some shears the handle and blade are of malleable iron, with a steel plate welded upon the inner face of the blade. In making this kind of shears the steel plate has been held in place on the shear-blade while being heated previous to welding by pins on the malleable iron passing into holes in the steel plate. In other shears the blade has been of steel, the handle of malleable iron, and the steel blade has been upon the inside of the malleable shank, usually known as the "nail-hole" or "ride." Sometimes the pin has been on the malleable-iron shank, entering a hole in the steel blade, and at other times the steel blade has had a projecting pin entering a hole in the malleable-iron shank. In this latter case, the steel pin being stronger than the malleable-iron shank, the said shank is sometimes cracked by the riveting. When the steel blade has had upon it the steel pin it has, in some instances, been welded to the outside of the shank of the handle, as in Patent No. 246,165.

My invention is an improvement upon the mode of manufacture heretofore adopted, the same being for insuring greater perfection in the connection of the steel blade with the handle-shank, so as to obtain a more perfect weld and lessen the risk of injury to the malleable-iron shank.

In the drawings, Figure 1 is a face view; Fig. 2, an edge view of the steel blade. Fig. 3 is a side view, and Fig. 4 is an edge view, of the malleable cast-iron handle. Fig. 5 is an elevation, partly in section, of the blade and handle complete.

The blade $a$ is to be of steel, of the desired size and shape. At the end next to the handle there is an offset and a plate or tang, 2, with a hole, 3, in it. The handle $b$ is of the proper size and shape. It is to be of malleable cast-iron or other metal. The shank portion 5 of said handle is provided with a pin, $i$, upon the outside, adapted to pass into the hole 3 in the blade and be riveted, so that the handle and blade are connected in their proper relative position previous to being welded. Borax or other suitable material is applied to the adjacent surfaces previous to their being heated, as usual. Two pins may be used in place of one.

The advantages of my improvement over the devices that had preceded it are that the hole being in the steel, the metal is not liable to be broken in riveting the pin. The steel coming outside the shank of the handle can be more easily and reliably welded than when it is inside the handle-shank, because the outside of the handle shank is flat, or nearly so, and there is not any shoulder or offset on the outside of the handle for the steel to be fitted to previous to welding the same; and if there is any imperfection in the welding it will be at the end of the handle, at its junction with the blade, and this will be on the inner face, and will be covered by the other blade of the shears, that crosses at this place. The plate 2 forms the finished outer surface of each blade at its junction with the handle, and the end of the plate 2 will give a finished appearance to the parts at the end toward the bow of the handle.

It is to be understood that the shears or scissors are composed of two complete parts, made as aforesaid, and united by a screw or rivet, as usual.

I claim as my invention—

The steel blade having a plate or tang, 2, with a hole in it, in combination with the metal handle having a pin, $i$, upon the outside of the shank, substantially as set forth, so that the steel of the blade comes outside of the shank of the handle in welding the parts together, substantially as set forth.

Signed by me this 21st day of September, A. D. 1881.

R. A. GOODCHILD.

Witnesses:
A. J. GIFFORD,
GEO. WARD.